(12) United States Patent
Hamada

(10) Patent No.: US 6,445,883 B1
(45) Date of Patent: Sep. 3, 2002

(54) DETECTING DEVICE AND CAMERA WITH THE DETECTING DEVICE

(75) Inventor: Masataka Hamada, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 48 days.

(21) Appl. No.: 09/618,131

(22) Filed: Jul. 17, 2000

(30) Foreign Application Priority Data

Jul. 21, 1999 (JP) .......................................... 11-206088

(51) Int. Cl.⁷ ................................................ G03B 13/36
(52) U.S. Cl. ...................................................... 396/96
(58) Field of Search ........................ 396/96, 121, 114; 348/311

(56) References Cited

U.S. PATENT DOCUMENTS 5,815,742 A    9/1998  Hamada et al. ............... 396/55
5,923,909 A    7/1999  Hamada ....................... 396/114
6,219,468 B1 * 4/2001  Yukawa et al. ......... 348/311 X

FOREIGN PATENT DOCUMENTS

JP            10126681        5/1998    .......... H04N/5/232

* cited by examiner

*Primary Examiner*—W. B. Perkey
(74) *Attorney, Agent, or Firm*—Burns, Doane, Swecker & Mathis, LLP

(57) ABSTRACT

A detecting apparatus for detecting a focusing condition or a distance from a subject, and a camera having the detecting apparatus. The apparatus includes: image taking lenses which make respective subject images on respectively individual positions; area photo sensor, which are of the charge accumulation type, arranged on the respective positions focused by the lenses; and at least one of brightness monitor, arranged across a detecting area of at least one of the area photo acceptance units, for controlling charge accumulating time of the area photo acceptance units.

28 Claims, 12 Drawing Sheets

DETECTING DEVICE AND CAMERA WITH THE DETECTING DEVICE

This application is based upon application No. 11-206088 filed in Japan, the contents of which are hereby incorporated by reference.

BACKGROUND OF THE INVENTION

1. Field of the Invention

The present invention relates to a detecting device and a camera having the detecting device.

2. Description of the Related Arts

Conventionally, there have been known some focus detecting devices, applied to cameras for example, which have lenses forming respective subject images by focusing beams of light coming from a subject and detect a focus or a distance from the subject, based on difference between the subject images.

Many of the focus detecting devices use line photo acceptance units having one-dimensional array or line, that is to say line sensors, which are of the charge accumulation type, and operate a shift of the focus or the distance, based on the difference of the subject images, which change in a arranging direction of the photo acceptance units corresponding to the distance from the subject.

As to the focus detecting devices, which use the photo acceptance units having one-dimensional array or line, however, the detecting region thereof is limited by the position and size of the subject. Therefore, in order to improve this problem, a method, which uses photo acceptance units, having two-dimensional array or matrix and being of the charge accumulation type, so as to detect the subject in the wide range, has been proposed (for example, U.S. Pat. No. 5,815,742).

As for general photo acceptance units, having two-dimensional array or matrix and being of the charge accumulation type, the charge accumulating time thereof is set a predetermined period at first. The data of charge thereof is read, and then the charge accumulating time is adjusted suitably, depending on the read data. Namely, the charge accumulating time is made shorter when the read data is overflowed, and the charge accumulating time is made longer when the read data is less than the desired level. Thereafter, the data are read again. The above procedures may be repeated, if the brightness of the subject is excessively high or low.

Thus, this method is not suitable for the focus detection which needs the rapid processing.

So, the method for controlling the charge accumulating time in real time by monitoring the brightness of the subject with a monitor arranged around the units has been proposed (for example, Japanese Non-examined Patent Publication No. 10-126681).

In the case of arranging the monitor around the area sensor, the charge accumulating time can be set suitably, when the brightness of the subject is uniform. When the brightness of the subject is not uniform, however, necessary data may overflow or be less than the desired level, and thus the focus can be detected with no accuracy.

It is not an especial case that the brightness of the subject is not uniform, and this may happen about the very usual subject. For example, in photographing a person, there is the case that the image of a portion of his or her clothes is made upon a monitor arranged around the area sensor, and the image of a portion of his or her face is made upon the area sensor. In this case, if the charge accumulating time is controlled depending on the data monitored by the monitor, the charge accumulating time becomes longer or shorter than the suitable one for the sensor, which senses brighter or darker portion than another portion monitored by the monitor. A difference in luminosity between the clothes and the face of the person may sometime exceed over three steps of diaphragm stop, which is equal to 8 times differences in accumulating time and data size. This causes a detection error.

SUMMARY OF THE INVENTION

Accordingly, it is an object of the present invention to provide a detecting device in which the detecting error is reduced even if the brightness distribution of the subject is not uniform. It is another object of the present invention to provide a camera having the detecting device.

In order to achieve one of the above objects, according to one aspect of the present invention, there is provided a detecting device for detecting one of a focusing condition and a distance from a subject, comprising: optical members which form respective subject images on respectively individual positions; area photo acceptance units, which are of a charge accumulation type, arranged on the respectively individual positions focused by the optical members; and at least one of brightness monitoring photo acceptance units, arranged across a detecting area of at least one of the area photo acceptance units, for controlling charge accumulating time of the area photo acceptance units.

The detecting device can be used, for example, in a single-lens reflex (SLR) camera in order to adjust the focus position of a photographic lens based on deference in the image forming positions (phase difference) between area sensor parts. The detecting device can be used, for example, in another camera except the SLR camera in order to measure a distance from a photographic subject using each positions of the area sensor parts, based on principle of triangulation. The area photo acceptance units, which are of the charge accumulation type, are, for example, solid-state image sensing devices.

In the detecting device, the at least one of brightness monitoring photo acceptance units, arranged on the center of detecting area of at least one of the area photo acceptance units, can monitor the brightness of the central part and its neighborhood in the detection area. Thus, the detecting devices can make the detecting error reduced. Specifically, main photographic subject, which focus or a distance from which should be detected by the detecting device, is usually arranged, for example, at the central position in the detecting region and can be monitored by the brightness monitoring photo acceptance units. While conventional devices, in which the brightness monitor is arranged around the detecting region, monitor the brightness not of the central position in the detecting region but of the peripheral position therein, and then sometime have large detecting errors for the main photographic subject.

Thus, the above-mentioned detecting device can make the detecting error reduced even in the case that the brightness distribution of the subject is not uniform.

In order to achieve the other of the above objects, according to another aspect of the present invention, there is provided a camera having a detecting device for detecting one of a focusing condition of a taking lens and a distance from a subject to be photographed, said camera comprising: optical members which form respective subject images on respectively individual positions; area photo acceptance units, which are of a charge accumulation type, arranged on the respectively individual positions focused by the optical members; and at least one of brightness monitoring photo acceptance units, arranged across a detecting area of at least one of the area photo acceptance units, for controlling charge accumulating time of the area photo acceptance units.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
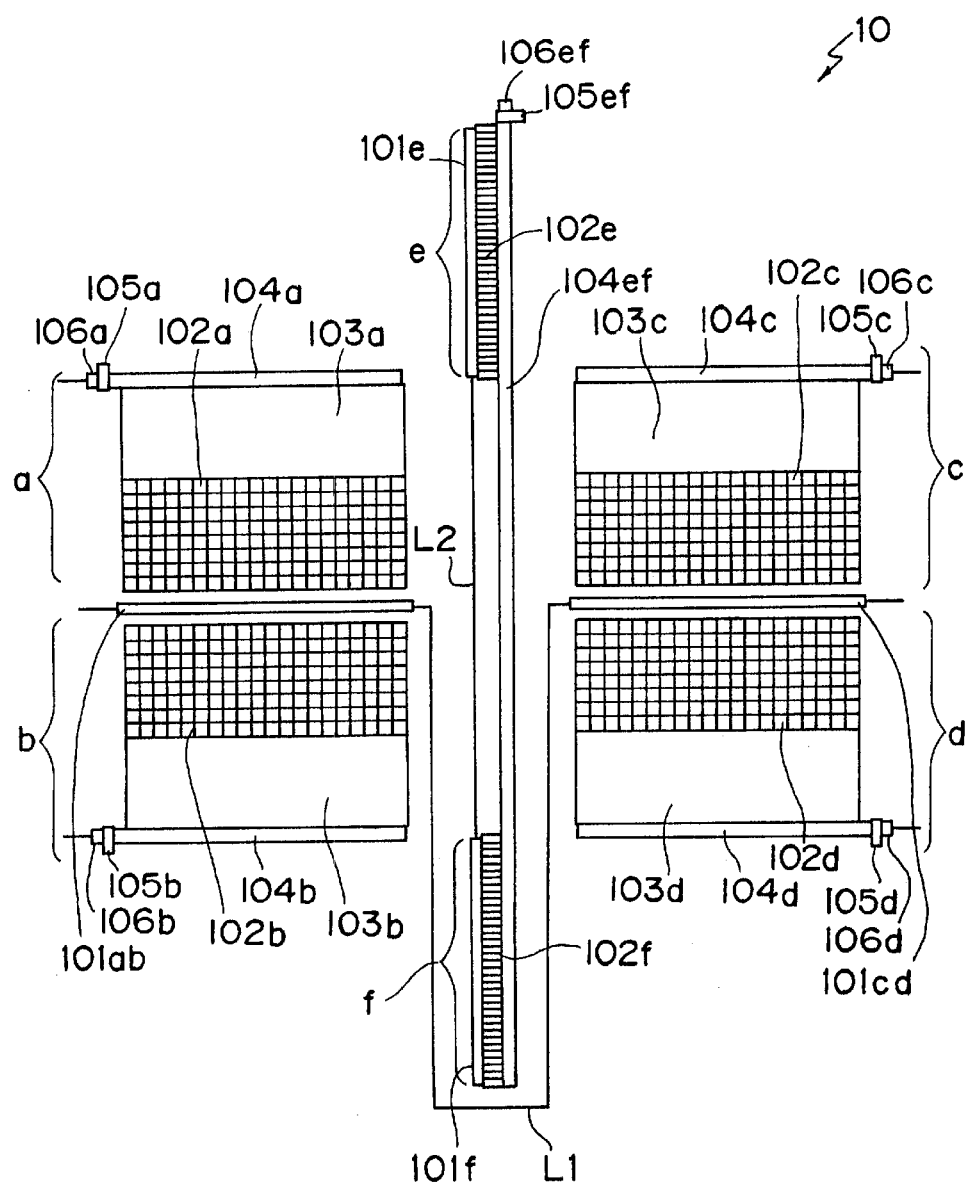
FIG. 1 is a plan view of a sensor in a focus detecting device of a camera according to a first embodiment of the present invention.

Before the description of the preferred embodiments according to the present invention proceeds, it is to be noted that like or corresponding parts are designated by like reference numerals through the accompanying drawings.

First, referring to FIGS. 1–7, 13A, 13B and 18, the description is made below upon a camera according to the first embodiment of the present invention. The camera is a single-lens reflex camera and has a focus detecting device.

Figure 2:
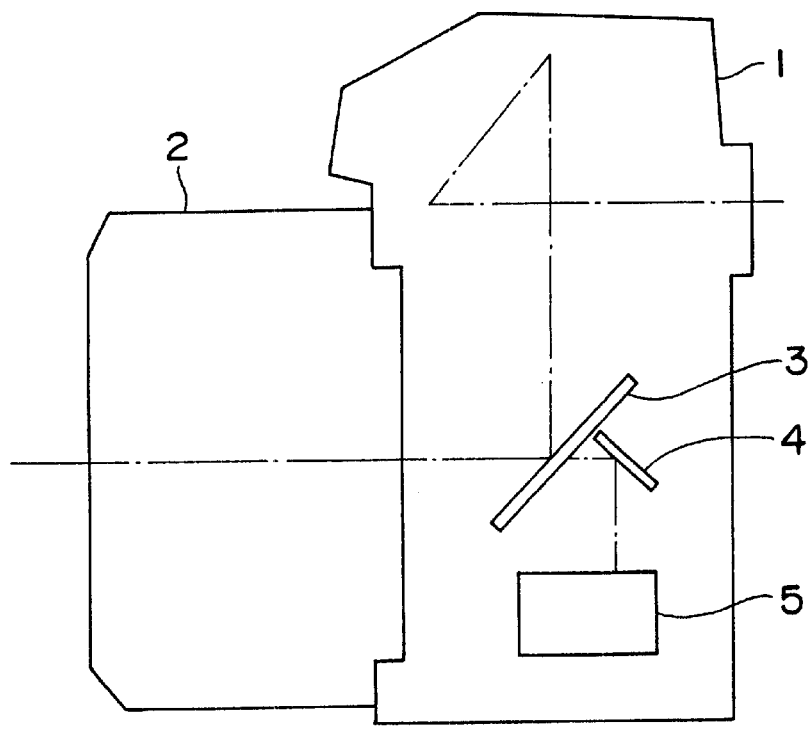
FIG. 2 is a schematic diagram of the camera which uses the focus detecting device as shown in FIG. 1.

FIG. 2 illustrates an arrangement of the focus detecting device 5 in the single-lens reflex camera. The focus detecting device 5 is arranged at the lower part of the camera body 1. A light from a photographic subject passes through a photography lens 2 and a main mirror 3, reflects by a sub-mirror 4, and is led to the focus detecting device 5 arranged in the lower part of the camera body 1.

Figure 3:
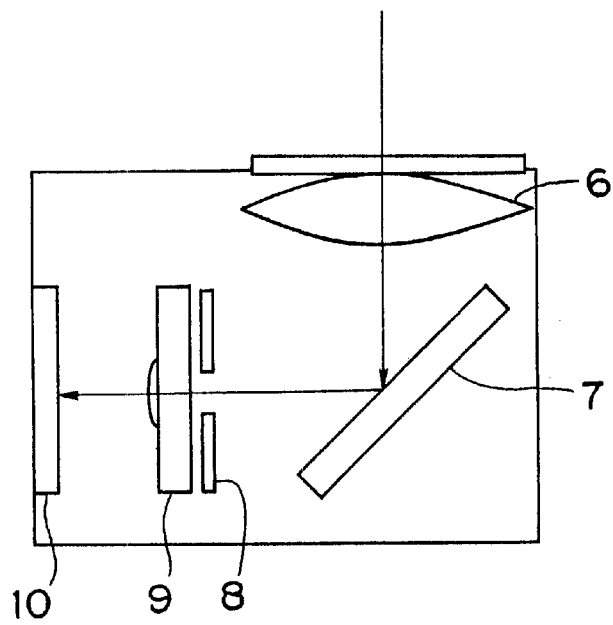
FIG. 3 is a schematic diagram of the focus detecting device according to the first embodiment of the present invention.

FIG. 3 illustrates a main internal construction of the focus detecting device 5. The light from the photographic subject passes through a capacitor lens 6, reflects by a module mirror 7, passes though a stop mask 8, passes through a separator lens 9, and is received by a electric charge accumulation type sensor 10 (hereinafter, also referred to as "sensor"). The separator lens 9 functions to focus the light from the photographic subject into two or more images on the sensor 10.

Figure 4:
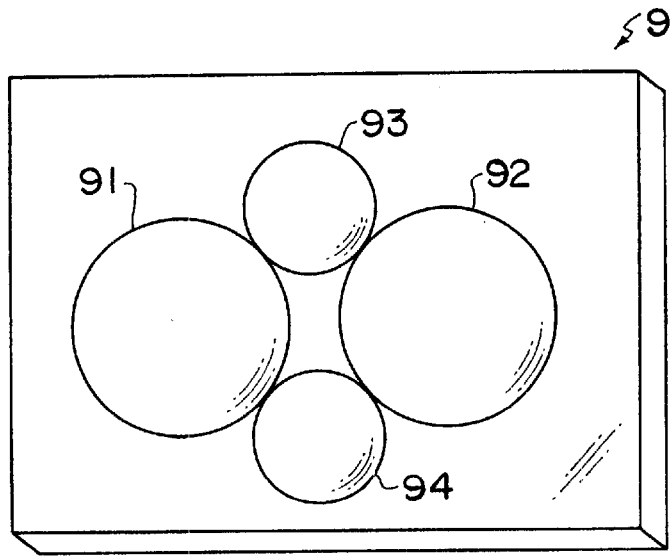
FIG. 4 is a perspective view of an image forming lens in the focus detecting device as shown in FIG. 3.

FIG. 4 shows the separator lens 9. The separator lens 9 has integral parts of lenses 91, 92, 93, and 94, which are made of the same transparent resin. A pair of the lenses 91 and 92 are for below-mentioned area sensor parts of the sensor 10, and the other pair of lenses 93 and 94 are for below-mentioned line sensor parts thereof. One of every pair thereof focuses the light from the photographic subject into a standard part, and the other into a reference part, respectively.

The electric charge accumulation type sensor 10 is used for detecting a focus and constructed as shown in FIG. 1. The sensor 10 may be either of the CCD type or of the MOS type. The sensor 10 is of CCD type hereinafter. If the sensor 10 is of the CCD type, it may be of the IT (interline transfer) type, the FT (frame transfer) type, or the FIT (frame interline transfer) type.

In the FIG. 1, reference letters a, b, c and d indicate area sensor parts, and reference letters e and f indicate line sensor parts. Reference characters 101ab, 101cd, 101e and 101f indicate luminosity monitors, which measure the photographic subject luminosity for deciding on electric charge accumulating time. Reference characters 102a, 102b, 102c, 102d, 102e and 102f indicate light receiving parts (photoelectric conversion parts), which convert the light received from the photographic subject into electric charge photoelectrically. Reference characters 103a, 103b, 103c and 103d indicate electric charge accumulation parts, which temporarily hold electric charge generated by the light receiving parts 102a, 102b, 102c and 102d, respectively.

If the sensor 10 is of the FT (frame transfer) type or of the FIT (frame interline transfer) type, the electric charge accumulation parts 103a, 103b, 103c and 103d are provided. If the sensor 10 is of the IT (interline transfer) type, however, no electric charge accumulation parts need to be provided because electric charge can be read without holding. Moreover, regarding the line sensor parts e and f, the discrete electric charge accumulation parts are not provided. This is because electric charge generated by the light receiving parts 102e and 102f can be held by the light receiving part 102e and 102f themselves, or by the below-mentioned shift register part 104ef.

The reference characters 104a, 104b, 104c, 104d and 104ef indicate shift register parts (read-out registers). As regards area parts a, b, c and d, respective electric charges thereof are read out separately. Reference characters 105a, 105b, 105c, 105d and 105ef indicate output gates, and reference characters 106a, 106b, 106c, 106d and 106ef indicate read-out parts. Electric charge thereof can be read out as the voltage. In this embodiment, line sensor parts e and f provide one shift register 104f in common in order to make a data characteristic of the line sensor part e and that of the line sensor part f as uniform as possible. The data characteristic includes the S/N characteristic of the read-out parts, and the amplification characteristic in the post-circuit.

The luminosity monitors 101e and 101f for the line sensor parts are connected to one another by a shortest path L2. The luminosity monitors 101ab and 101cd for the area sensor parts are connected to one another by a path L1, bypassing around the light receiving parts for the line sensor parts. That is, one monitoring carries out for the area parts. With regard to each area sensor parts a, b, c and d divided into four, same accumulation control therefor is performed, but four read-out parts 106a, 106b, 106c and 106d are provided. This can make the read-out time thereof faster.

Figure 5:
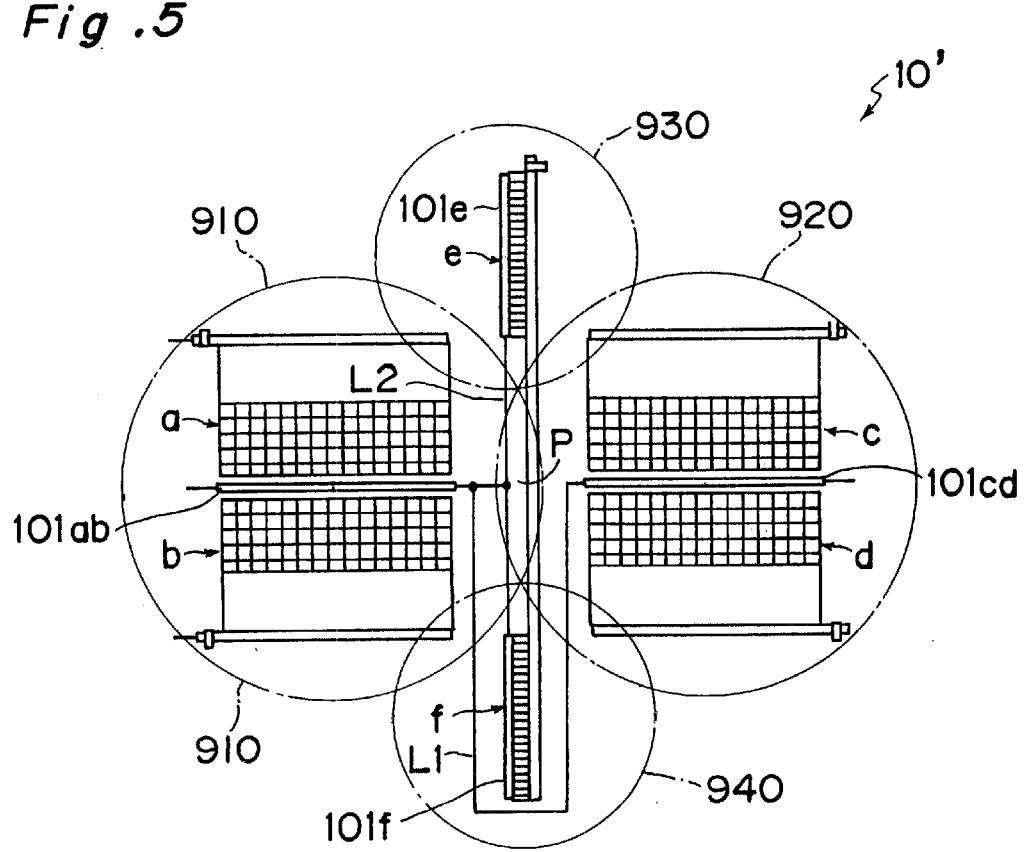
FIG. 5 is a plan view of a modified sensor of that as shown in FIG. 3.

FIG. 5 shows a state in which images are thrown on a modified electric charge accumulation type sensor 10' by the separator lens 9, which divides the light from the photographic subject into that for the standard parts and that for the reference parts.

It is noted that the state of throwing images on the sensor 10' as shown in FIG. 5 is the same as that using the sensor 10 as shown in FIG. 1, though the sensor 10' differs from the sensor 10 in that four monitors 101ab, 101cd, 101e and 101 f of the sensor 10' are connected to a point P. Regarding the discrete monitors in FIG. 1, the monitors 101ab and 101cd for area are connected to each other by the connecting line L1 and the monitors 101e and 101f for line are connected to each other by the connecting line L2. Alternatively, the monitors for area and the monitors for lines may be connected to each other and controlled together, as shown in FIG. 5, since these monitors detect the similar images of the central part of the photographic subject and the difference thereof is only a direction of read-out, as described below.

The lenses 91 and 92 make, or form, images upon ranges 910 and 920, which respectively cover the whole of the light receiving parts of two sets of the area sensor parts a, b; c, d in the electric charge accumulation type sensor 10', respectively. Under in-focus condition, the two images turn into the completely same image. The area sensor parts can detect horizontal phase difference (shift of the photographic subject images).

On the other hand, the lenses 93 and 94 make images upon ranges 930 and 940, which respectively cover the whole of the light receiving parts of the line sensor parts e and f in the electric charge accumulation type sensor 10'. Under in-focus condition, the two images also turn into the completely same image. The line sensor parts can detect vertical phase difference (shift of the photographic subject images).

The reason why the monitor 101ab, 101cd; 101e, 101f are arranged in both standard parts and reference parts as well as shown in FIG. 1 is as follows.

Under in-focus condition, coincided images of the photographic subject are focused onto the standard part and the reference part. Under out-of-focus condition, however, the distance between coincided images' thereof is changed, and, so to speak, different lights from the photographic subject enter into the standard part and the reference part, respectively. In this case, if the light entering into the standard part and the light entering into the reference part make little difference in luminosity, it is possible to control the accumulating time for both parts by monitoring the luminosity of either one of them. If the difference in luminosity between the light entering into the standard part, and the light entering into the reference part is large, the displacement of the images thereon makes it impossible to control the accumulating time for both parts by monitoring the luminosity of either one of them. Therefore, the luminosity monitors 101ab, 101cd; 101e, 101f are arranged for both of the standard part and the reference part, and connected to each other by the connecting lines L1 and L2, respectively, in order to control both parts, based on the sum of the luminosity of both parts.

In the operation of the above described sensor 10, the luminosity monitors 101ab, 101cd; 101e and 101f start to work along with the starting of accumulation in the sensor parts a, b, c and d; e and f, monitor the light from a photographic subject, and stop the accumulation therein, when monitoring values up to predetermined one. In order to make this work effective, the luminosity monitors 101ab, 101cd; 101e and 101f are arranged near the sensor parts a, b, c and d; e and f, so that the luminosity monitors 101ab, 101cd; 101e, 101f and the sensor parts a, b, c, and d; e and f look at the same photographic subject.

In this embodiment, the monitors 101ab and 101cd for area are placed in the center of the area sensor parts a and b; c and d. When overall luminosity of the photographic subject is uniform, it is possible to set up accumulating time even if the monitors are arranged around the area sensor parts a and b; c and d. When a luminosity distribution of the photographic subject is not uniform, however, a required data may overflow or become too small, because of the difference in intensity between the light received by the monitors and that received by the sensor parts. In this case, it is impossible to detect a focus correctly or precisely.

The case that a luminosity distribution of a photographic subject is not uniform is not limited under a special condition, but there are such cases even for a very common photographic subject.

For example, in photographing a person, it is such a case that an image of a portion of his or her face is made, or formed, upon an area sensor arranged at a center, and an image of a portion of his or her clothes is made upon a monitor, arranged only about the circumference of the area sensor, for controlling the area sensor. In this case, the accumulating time for the area sensor may become longer or shorter than proper time for required data region thereof, since the portion of his or her face is frequently brighter or darker than the portion of his or her clothes. Sometime, a difference in luminosity between the clothes and the face of the person may exceed over three steps of diaphragm stop, which is equal to 8 times differences in accumulating time and data size. This causes a detection error directly.

Figure 13A:
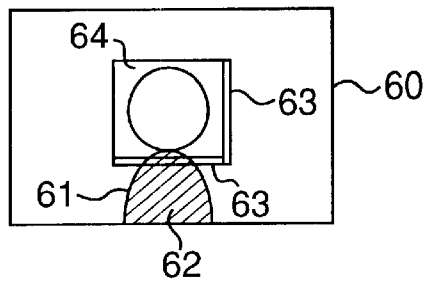
FIG. 13 is an explanatory view of the relationship between sight of a finder and brightness monitor.

FIG. 13A shows how to see through a finder frame 60 in a conventional camera. As shown in the figure, the monitors 63 are arranged in a L shape at the circumference of the focus detecting region 64. The above-mentioned problem arises, if an image of clothes 62 of a person 61 overlaps a monitor 63 as shown in the figure and so on.

Therefore, the monitors are arranged at central positions, where every image used as the standard parts or the reference parts is made, or formed, upon, in order to reduce detecting errors even if the luminosity distribution of the photographic subject is not uniform.

Specifically, as shown in FIG. 5, not only one area sensor part, but also a plurality of divided area sensor parts, are arranged in every range for the standard part and the reference parts. In this embodiment, the luminosity monitors 101ab and 101cd are arranged between area sensor parts a and b; c and d, namely at the position almost equal to the center of a photographed scene. Thereby, the probability to perform proper accumulation control for the area sensor parts is large, even if there is no uniform brightness or luminance distribution of the photographic subject, because of high probability that the luminosity monitors 101*ab* and 101*cd* catch the main photographic subject disposed nearly at the center of the photographed scene. Also, it is easy to design a same and small size circuit for every area sensor parts a, b, c, and d , because each area sensor part receives upper or lower part of a focused image.

Figure 13B:
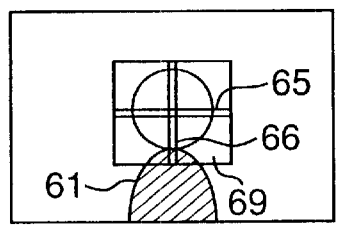

With this case, FIG. 13B shows the relationship between the monitors and a photographic subject in a photographed scene. A reference numeral 65 indicates a position of the monitor for the area sensor parts, a reference numeral 66 indicates a position of the monitor for the line sensor parts, and a reference numeral 69 indicates a focus detecting region. The positions 65 and 66 cross at right angles at the center of the scene where a main photographic subject 61 exists. Though the area sensor parts are arranged horizontally and the line sensor parts are arranged vertically in the figure, alternated arrangement thereof can be used. That is, the area sensor parts may be arranged vertically, and the line sensor parts may be arranged horizontally.

Figure 6:
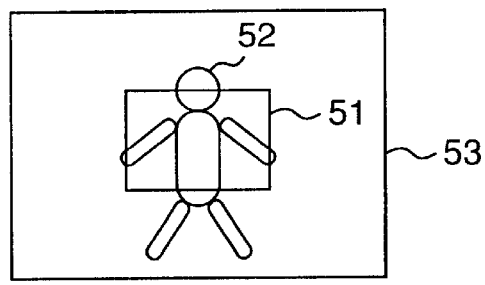
FIG. 6 is an explanatory view of how to see through a finder.
Figure 7:
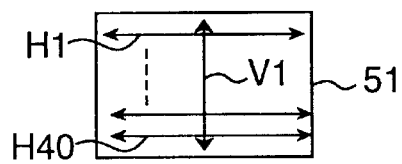
FIG. 7 is an explanatory view of scanning direction in a detecting region.

FIG. 6 shows how to see a photographic subject through a finder. A reference numeral 53 indicates a finder frame and a reference numeral 52 indicates a photographic subject and a reference numeral 51 indicates a focus frame. The focus frame 51 shows the region detected by the focus detecting device. In this region, as shown in FIG. 7, a focus can be detected along every horizontal line. For example, 40 focuses can be detected along the horizontal line H1 to H40 in the figure. With FIG. 6, a focus can be detected, if there is horizontal contrast in the region from a face to a breast on the subject 52.

However, in the case that there is no horizontal contrast in a scene like mountains, horizontally arranged sensors cannot detect a focus. Therefore, the vertical line sensor parts are provided in order to detect a focus by using vertical contrast. In the FIG. 7, a reference character V1 indicates a vertically detecting line.

As described above, a plurality of sets of image making lenses (or image forming lenses) and solid-state image sensing devices are provided and arranged across each other. Photo acceptance units in at least one set of the solid-state image sensing devices have one-dimensional array or line, while photo acceptance units in at least another set of the solid-state image sensing devices have two-dimensional array or area. Crossing arrangement of the sets of solid-state image sensing devices makes it possible to detect a focus, even if there is either horizontal or vertical contrast distribution in the photographic subject like mountains.

Also, the photo acceptance units having one-dimensional array are arranged across the photo acceptance units having two-dimensional array. In case that the photographic subject is the above-mentioned mountain and the like, it is possible to use the photo acceptance units having one-dimensional array as for one of detecting directions which cross each other. Using the photo acceptance units having two-dimensional array as for both of detecting directions which cross each other makes the focus detecting device larger so as to keep the light path. Furthermore, it causes the solid-state image sensing devices to be larger and the manufacturing cost to get higher. Considering the probability of detecting the focus, it is practically useful to use the photo acceptance units having one-dimensional array as for one of detecting directions which cross each other.

Figure 18:
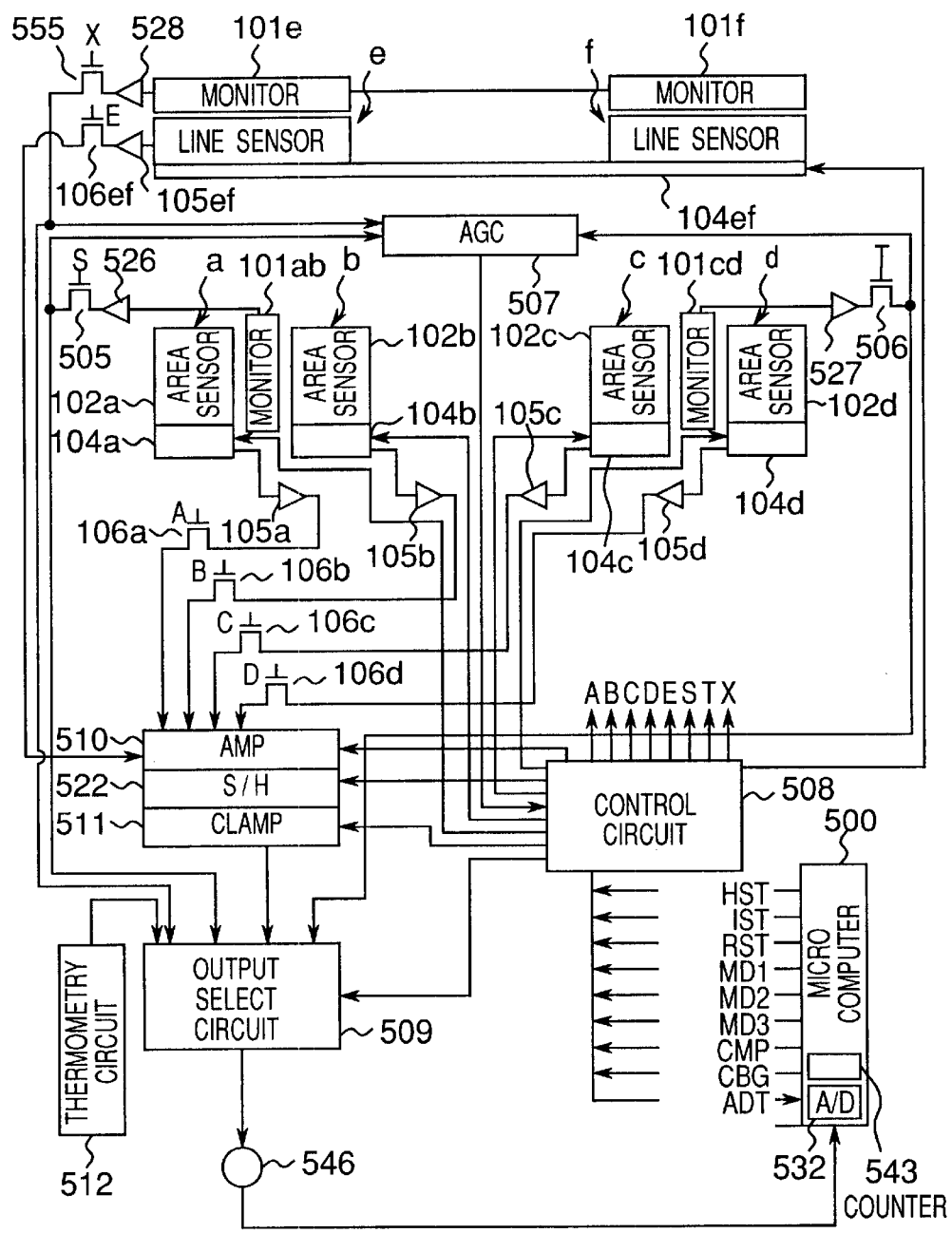
FIG. 18 is a schematic drawing of a circuit for controlling the sensor as shown in FIG. 1.

FIG. 18 is a schematic drawing of the device composition for the picture detection system of the camera, which has the sensor 10 as shown in FIG. 1 and the control circuit 508 for controlling the sensor 10.

The outputs of the area sensor parts a, b, c and d and those of the line sensor parts e and f are used for distance measuring or focus detection. The monitor 101*ab*, 101*cd*; 101*e*, 101*f* are photoelectric transfer elements.

This device is provided with main components. Those include two sets of the area sensor parts a, b; c and d having horizontal registers 103*a*, 103*b*, 103*c*, 103*d*; 103*e*, the monitors 101*ab* and 101*cd* arranged in the center of every set of the area sensor part a, b; c and d, the line sensor parts e and f having common horizontal register 104*ef*, the monitors 101*e* and 101*f* thereof, AGC circuit 507, control circuit 508, gain variable amplifier 510, S/H (sample hold) circuit 522, clamp circuit 511, output selection circuit 509, and the temperature detection circuit 512, and microcomputer 500. Furthermore, the device has output buffers thereof and output switches thereof.

That is, the output buffers 526, 527, 528 for the monitor 101*ab*, 101*cd*, 101*e* and 101*f*, the output buffers 105*a*, 105*b*, 105*c*, 105*d* and 105*ef* for the horizontal transfer registers 104*a*, 104*b*, 104*c*, 104*d* and 104*ef*, and the output switches 106*a*, 106*b*, 106*c*, and 106*d* and 106*ef* are provided. Hereinafter, the control circuit 508 is also referred to as a sensor drive part, and the gain variable amplifier 510, the S/H circuit 522, the clamp circuit 511 and the output selection circuit 509 are also referred to as a sensor output processing circuit part.

The monitors 101*ab*, 101*cd* and 101*e* and 101*f* monitor the electric charge accumulating times of corresponding sensor parts a, b, c, d, e and f, respectively. The horizontal transfer registers 104*a*, 104*b*, 104*c*, 104*d* and 104*ef* hold temporarily the electric charges of the sensor parts a, b, c, d, e and f, and output them serially. The clamp circuit 511 operates to the timing to which the electric charge of a black standard pixel (OB) is outputted from the sensor parts a, b, c, d, e and f, and clamps the voltage for dark current on a certain predetermined voltage. The output selection circuit 509 is common to all outputs, and it chooses an output from the outputs of the sensor parts a, b, c, d, e and f and the outputs of the temperature detection circuit 512 to output it by control of the circuit 508.

The device, including the above-mentioned elements except the microcomputer C, is formed as one tip IC (integrated circuit) which is formed on a substrate. Hereafter, the description is made below on the assumption that the elements formed on the tip are provided inside, and the elements not formed on the tip are provided outside.

Monitor signals outputted from the monitors 101*ab*, 101*cd*, 101*e* and 101*f* are alternatively given to the AGC circuit 507 and the output selection circuit 509 through the output buffers 526, 527 and 528 and the output switches 505, 506 and 555. The output switches 505, 506 and 555 are formed with MOS transistors, respectively, and they are conducted or closed when the low level of switching signals S, T, and X generated by the control circuit 508 is applied to their gate terminals. A monitor signal given to the AGC circuit 507 and the output selection circuit 509 is selected depending on which of the output switches is conducted. That is, depending on one of the switching signals S, T, and X, corresponding monitor signal from one of the monitor 101*ab*, 101*cd*, and 101*e*+101*f* can be chosen. Selection of the monitor signal is mentioned later.

The sensor parts a, b, c, d, e and f and the monitors 101*ab*, 101*cd*, 101*e* and 101*f* start accumulation thereof simultaneously. After starting accumulation thereof, the AGC circuit 507 monitors whether the monitor signal inputted thereinto reaches to a predetermined voltage. When the monitor signal reaches to the predetermined voltage, the AGC circuit 507 transmits that information to the control circuit 508. When the control circuit 508 receives that information, it terminates the accumulation of the sensor parts a, b, c, d, e and f, and transmits the end of the accumulation to the microcomputer 500, which is outside of the device (hereinafter, the above-mentioned end of the accumulation is referred to as "automatic end"). The AGC circuit 507 can comprise a comparator, which compares the monitor signal, for example, with the predetermined voltage as a reference voltage.

If the monitor signal has not reached to the predetermined voltage after a predetermined period passes, namely if the control circuit 8 has not transmitted the information that the monitor signal reaches to the predetermined voltage to the microcomputer 500 outside the device, the microcomputer 500 instructs the control circuit 8 to force the sensor parts a, b, c, d, e and f to stop accumulation thereof and accumulation thereof stops forcibly (hereinafter, the above-mentioned end of the accumulation is referred to as "forcible end").

After automatic or forcible end of accumulation, the monitor signal, which is given to the microcomputer 500 outside the device through a VOUT terminal 546 from the output selection circuit 509, is converted analog to digital by the A/D converter 532. According to the converted digital signal, a rate of amplification for the output of the area sensors is determined. The rate of amplification is set up to the gain variable amplifier 510. The rate of amplification is set at 1, when accumulation is completed automatically. Alternatively, when accumulation is completed automatically, the rate of amplification may be set at 1 without carrying out A/D conversion of the monitor signal.

On the other hand, after accumulation ends, the outputs of the sensor parts a, b, c, d, e and f are transmitted to the horizontal transfer registers 104a, 104b, 104c, 104d and 104ef, inputted into the gain variable amplifier 510 through the output buffers 105a, 105b, 105c, 105d and 105ef and the output switches 106a, 106b, 106c, 106d and 106ef, and amplified at the rate of amplification set up previously hereby. The switches 106a, 106b, 106c, 106d and 106ef are constructed as well as the switches 505, 506 and 555, and the control circuit 508 generates the switching signals A, B, C, D and E and chooses the output given to the gain variable amplifier, 510 from those of the sensor parts a, b, c, d and e+f. Epexegetically, the sensor part a is not necessary to have the same size as the sensor part b, and the sensor part c is not necessary to have the same size as the sensor part d.

Next, referring to FIGS. 8 through 10, the description is made below upon a camera, except the SLR camera, according to the second embodiment of the present invention, though the above description regards the single-lens reflex camera.

Figure 8:
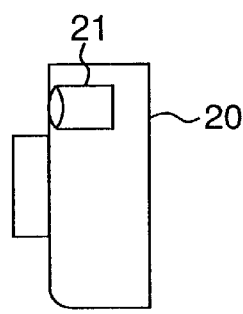
FIG. 8 is a schematic diagram showing a camera with a focus detecting devise according to a second embodiment of the present invention.
Figure 9:
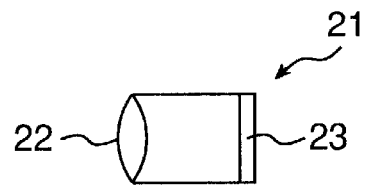
FIG. 9 is a schematic diagram showing a main part of the camera as shown in FIG. 8.

In FIG. 8, a reference numeral 20 indicates a camera body and a reference numeral 21 indicates a distance measuring equipment. The distance measuring equipment 21 comprises an image making lens (image forming lens) 22 and a sensor 23, as shown in FIG. 9. In the case of the camera, not a focus, but a distance, is detected by the principle of triangulation. The image making lens, which makes, or forms, subject images by focusing the light from the photographic subject, is different in size from that in the focus detecting device but constructed as well as that shown in FIG. 4

Figure 10:
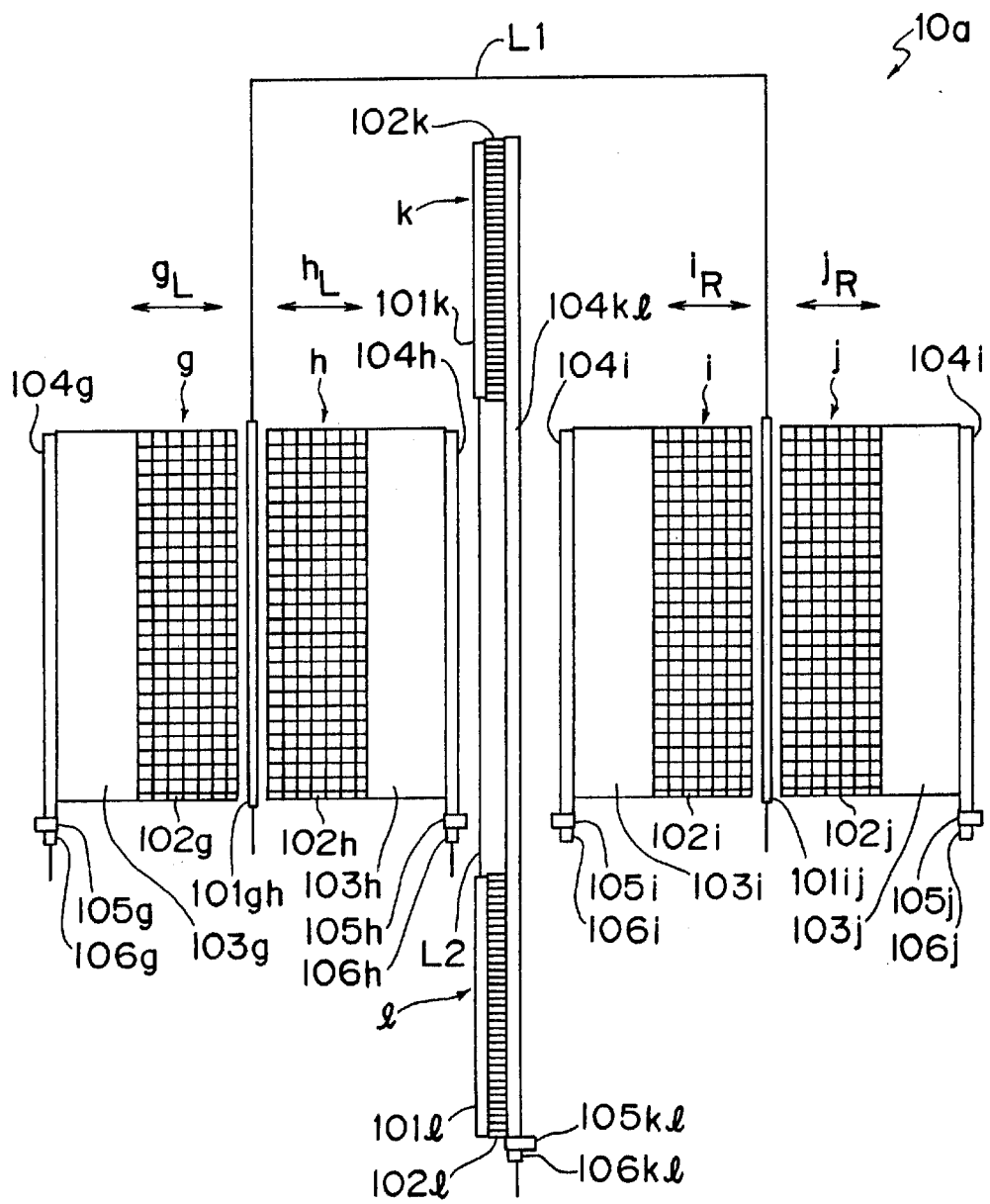
FIG. 10 is a plan view of a sensor in the focus detecting device according to the second embodiment of the present invention.

FIG. 10 indicates the construction of a sensor 10a in a distance detecting device according to the second embodiment of the present invention. The monitors for both the line sensor parts and the area sensor parts are arranged horizontally. Every set of the area sensor parts is divided into two parts g, h; i and j.

When the correlation between the standard part and the reference part is operated, a dead zone can appear due to the monitor, because it is necessary to correlate the output of the pixels with each other with shifting the output in the direction of a row of the lenses. However, if shifting regions are limited, it is possible to detect the focus without the dead zone. Therefore, the pixels are divided into blocks in the direction as shown by arrows, namely arrows $g_L$, $h_L$ for the standard parts and arrows $i_L$, $j_L$ for the reference parts, in the figure.

In addition, the dead zone by the luminosity monitors can have nearly the same width as the pitch of each pixel, for example, about 15 micrometers width, and there is almost no actual problem caused by the dead zone. Furthermore, if it is set several micrometers nearly equal to the width of a channel stopper between pixels, the influence of the luminosity monitors can be disregarded. Epexegetically, the area sensor part g is not necessary to have the same size as the area sensor part h, and the area sensor part i is not necessary to have the same size as the area sensor part j.

Figure 11:
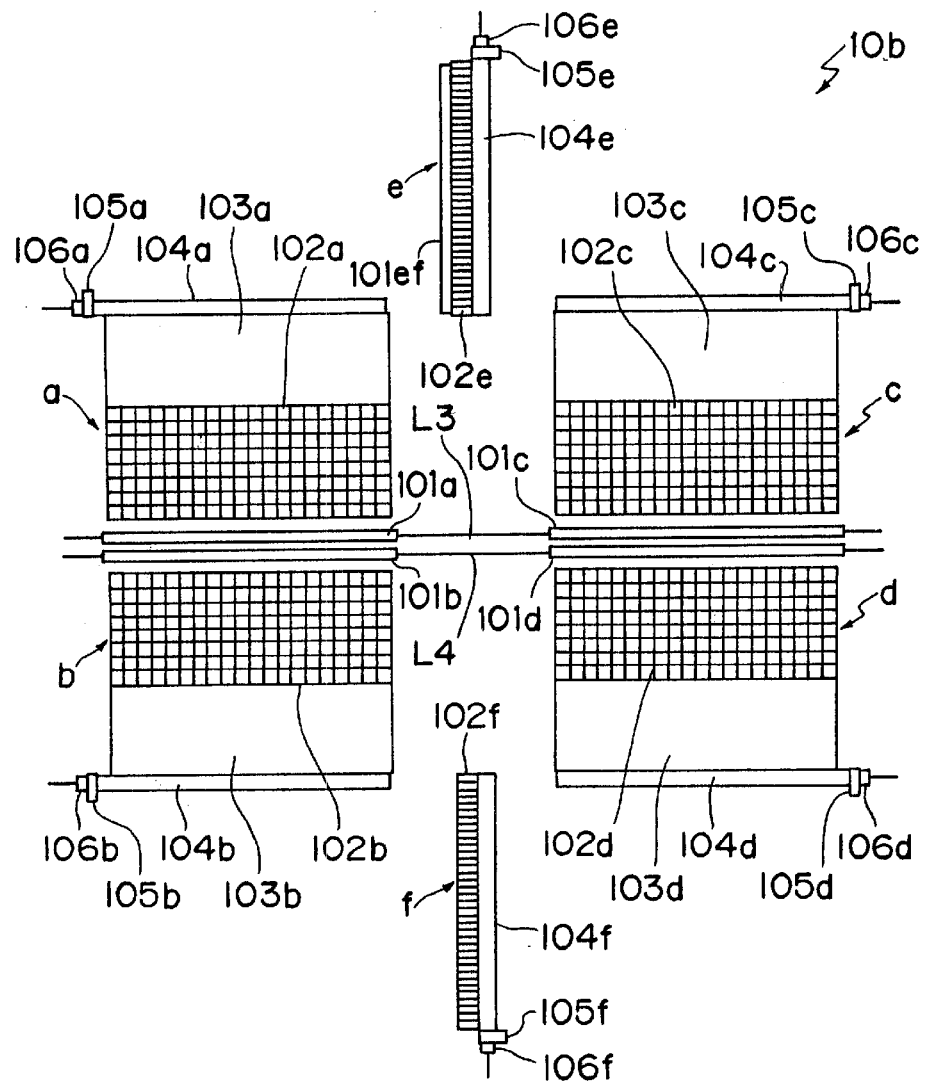
FIG. 11 is a plan view of a sensor in a focus detecting of a camera device according to a third embodiment of the present invention.

FIG. 11 shows the construction of a sensor 10b of a focus detecting device of a camera according to the third embodiment of the present invention.

The area sensor parts a, b, c and d have the luminosity monitors 10a, 10b, 10c and 10d, respectively. That is, readings of every area part a, b, c and d are controlled completely independently. On the other hand, regarding the luminosity monitors for the area parts a, b, c and d, their standard parts and reference parts are connected each other. Specifically, the luminosity monitors 101a and 101c are connected each other by the connecting line L3, and the luminosity monitors 101b and 101d are connected each other by the connecting line L4. By monitoring respective sums of outputs of the luminosity monitors, the area parts a and c are controlled by one surveillance state, while the area parts b and d are controlled by another surveillance state.

Furthermore, the monitor is omitted about the line sensor part f. Instead, the line sensor part f is also controlled by the monitor 101ef, as well as the line sensor part e. In this case, area of the monitor 101ef, which is provided for both line sensor parts e and f, is twice as large as that of every one of the monitors 101e and 101f, which are provided for every line sensor parts e and f, respectively. Thereby, average output of the luminosity monitor provided for both of the line sensor parts is equivalent to that of every one of the luminosity monitors provided for every line sensors, and accumulation controls for the line sensor parts using the monitor becomes equivalent to that using both of the monitors. Epexegetically, the area sensor part a is not necessary to have the same size as the area sensor part b, and the area sensor part c is not necessary to have the same size as the area sensor part d.

Figure 12:
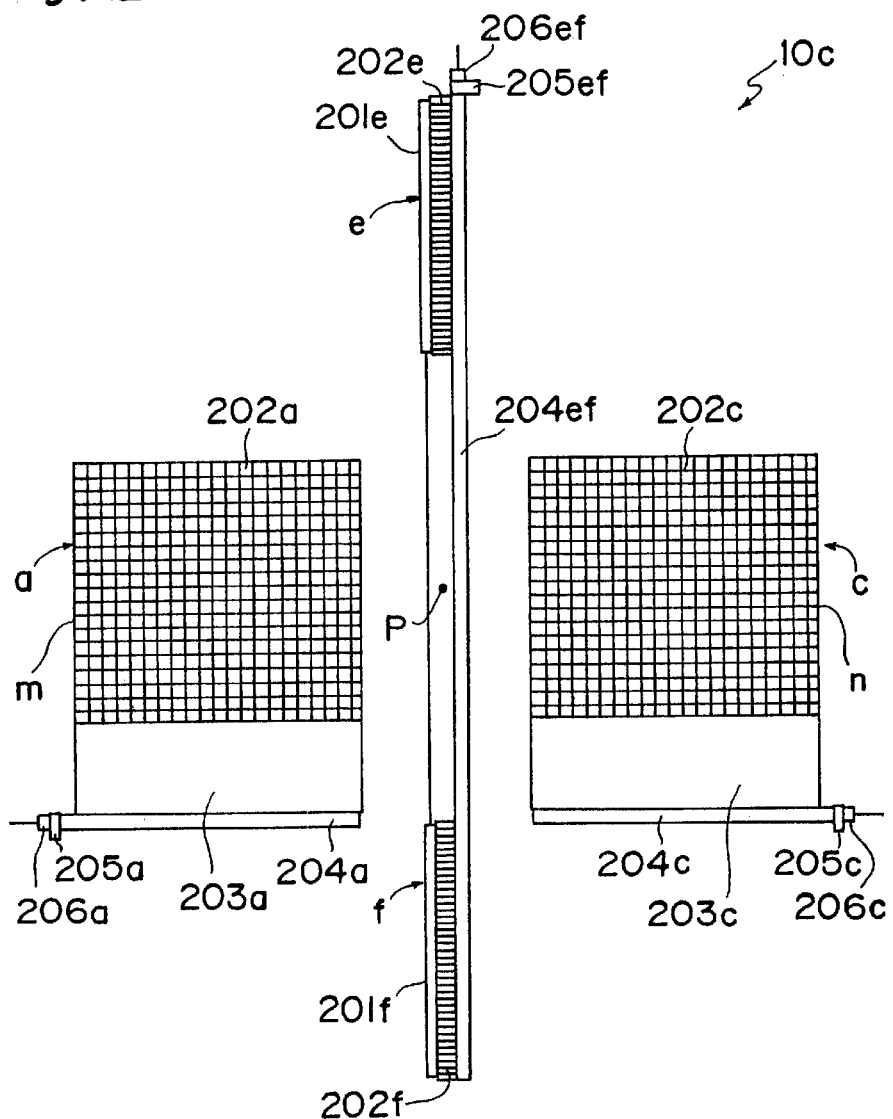
FIG. 12 is a plan view of a sensor in a focus detecting device of a camera according to a fourth embodiment of the present invention.

FIG. 12 shows a construction of a sensor 10c in a focus detecting of a camera device according to the fourth embodiment of the present invention.

In this embodiment, separate monitors are provided in only the direction of a row of line sensor parts. Reference characters a and c indicate the area sensor parts and reference characters e and f indicate the line sensor parts which are also of the CCD type. Reference characters 201e and 201f indicate the luminosity monitors to measure the luminosity, of the photographic subject for deciding on electric charge accumulating time. Reference characters 202a, 202c, 202e and 202f indicate the light receiving parts (photoelectric conversion parts), which receive the light from the photographic subject and convert it into electric charge photoelectrically. Reference characters 203a and 203c indicate electric charge accumulation parts, which temporarily hold electric charge generated by the light receiving parts 202a and 202c. Reference characters 204a, 204c and 204ef indicate shift register parts (read-out registers). The area parts of a and c are read separately and respectively. Reference characters 205a, 205c and 205ef indicate the output gates, and reference characters 206a, 206c and 206ef indicate the read-out parts. Electric charge data is read as the voltage.

In order to read out the charges of both the line sensor parts e and f together, the shift register 204ef is provided. The monitors 201e and 201f for the line sensor parts are connected each other by the shortest path, while the monitors for the area sensor parts are omitted.

Figure 13C:
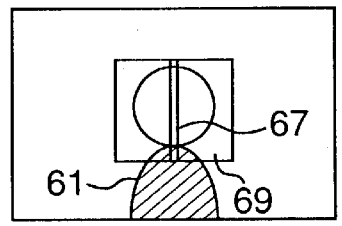
Figure 13D:
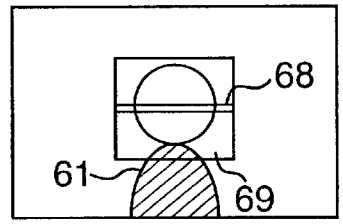
Figure 13E:
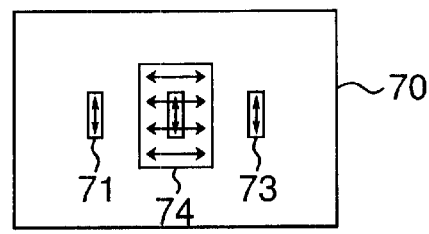

FIG. 13C shows how to see through the finder frame in the camera. A reference character 67 indicates the position of the monitor. FIG. 13D indicates another embodiment where the arrangement regarding the area sensor parts and the arrangement regarding the line sensor parts are rotated by 90 degrees. A reference character 68 indicates the position of the monitor.

Figure 14:
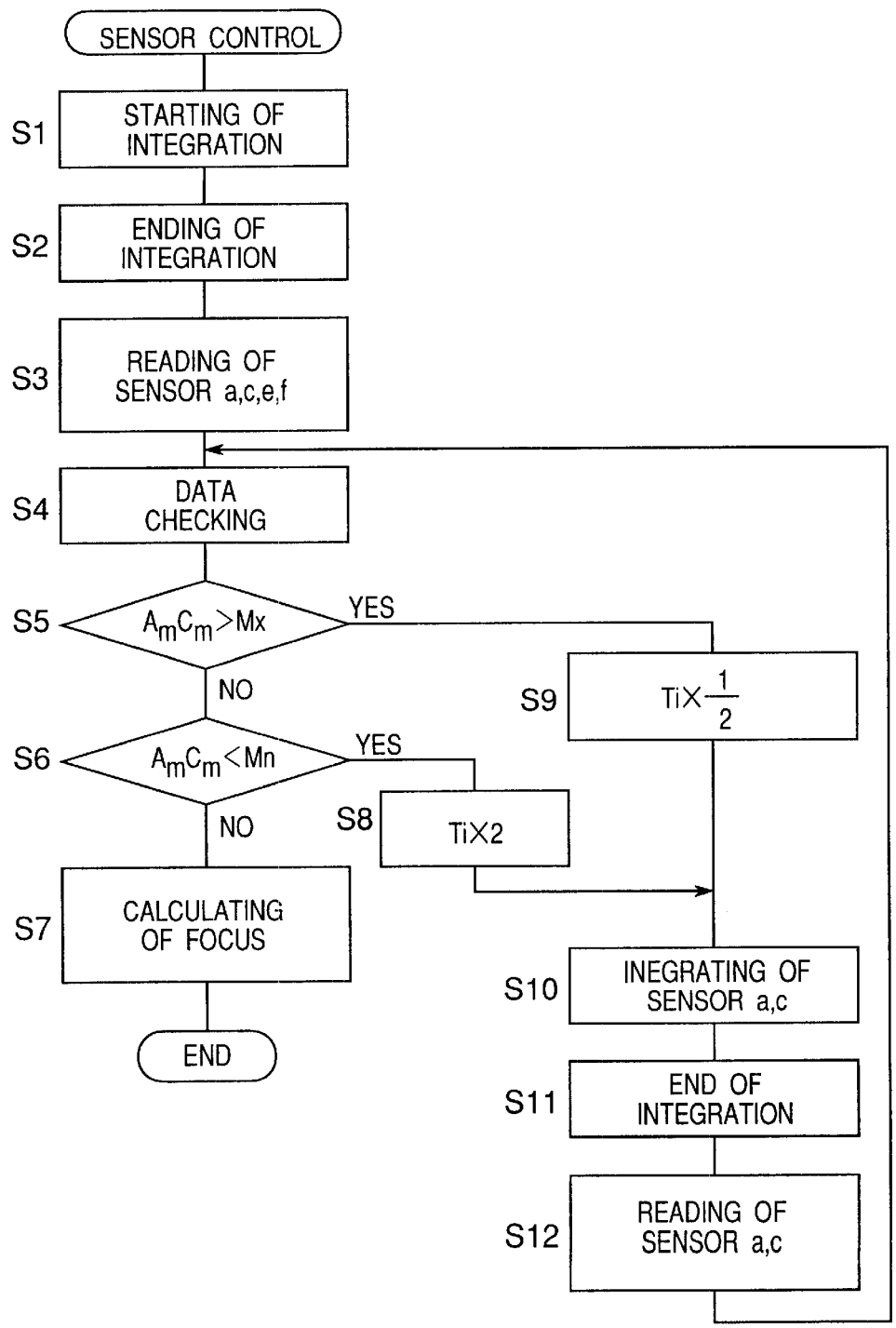
FIG. 14 is a flow chart showing a brightness monitoring operation.

In the fourth embodiment, controlling is performed according to the flow as shown in FIG. 14.

That is, in step S1, the accumulations of the sensor parts a, c, e and f start. In step S2, if an output of the monitor for the line sensor parts becomes a predetermined value, four sensor parts a, c, e and f stop the accumulation thereof automatically. "Automatically" means the way of controlling by using only electric circuit. In step S3, the output data from the sensor parts a, c, e and f is taken into, for example, a microcomputer, and in step S4 each of the output data is checked by the microcomputer.

There are some checking methods, including, for example, checking maximum and minimum value, checking mean data, using median and so on. For example, the average value $A_m$ of the sensor part a and the average value $C_m$ of the sensor part c are used in this embodiment.

In step S5, if Am or Cm is larger than a predetermined value Mx, step S9 is carried out because it is possible for the output data of the sensor parts to overflow. Alternatively, peak value may be used for Am or Cm and another predetermined value which can not overflow may be used for Mx.

In step S6, if $A_m$ or $C_m$ is smaller than the predetermined value Mn, step S8 is carried out, because there is a possibility that the output data of the sensor parts is too small. Alternatively, for example, minimum value may be used for Am or Cm and still another predetermined value, which can not drop S/N during operation.

In step S9, next or following accumulating time is set up to be one half of the present accumulating time. In step S8, next accumulating time is set up to be twice as long as the present accumulating time.

In step S10, accumulation is performed again as for only the sensor parts a and c. In step 11, accumulation is performed during the next accumulating time set up in step S9 or S8, and accumulation is terminated forcibly by software controlling. In step S12, only the data of the sensor parts a and c is taken into a controller, for example, the microcomputer, and step S4 is carried.

In step S7, if the data suitable for operation is obtained, focus detecting operation is performed using the data of the parts a, c; e and f.

Alternatively, by monitoring a central row m, n of the area sensor parts a, c, it is possible to control an accumulation of the area sensor parts a, c without using the monitors 201e, 201f. Epexegetically, the row m, n is not necessary to be in the center of the area sensor parts a, c, and may be biased upward or downward.

Figure 15:
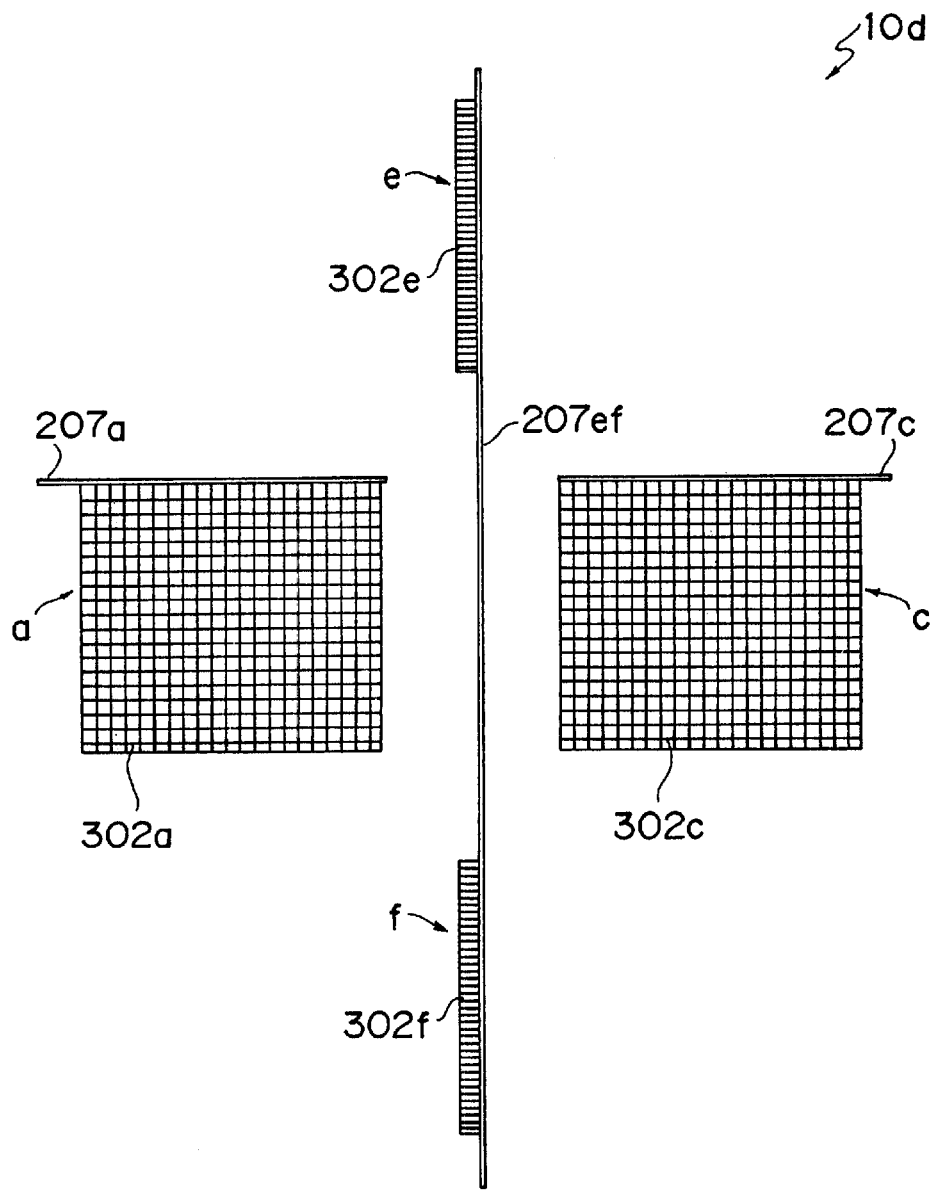
FIG. 15 is a plan view of a sensor in a focus detecting device of a camera according to a fifth embodiment of the present invention.

FIG. 15 shows a construct of a sensor for a focus detecting device of a camera according to the fifth embodiment of the present invention.

The sensor 10d is of the CMOS type sensor and has pixel monitor ability only in the line sensor parts. As to the sensor of this type, data from each pixel in the line sensor parts is taken out by switching. Reference characters a and c indicate the area sensor parts, and reference character e and f indicate the line sensor parts. Reference characters 302a and 302c indicate the light receiving parts in the area sensor parts, and reference characters 207a and 207c indicate the data read-out lines therein. Reference characters 302e and 302f indicate the light receiving parts in the line sensor parts, and reference character 207ef indicates the data read-out line therein.

As for luminosity monitor ability, every one of the pixels is provided with a circuit for reading the photoelectric charge therein without destruction so that accumulation thereof is stopped when the photoelectric charge in any one of the pixels reaches a predetermined value. Namely, that is the peak check of the line sensor parts.

As for the line sensor parts, it is easy to arrange the circuits in parallel. That is the reason why only the line sensor parts have the monitors. If the monitors are arranged in the area sensor parts, pitch of pixels therein needs to be wider, thus sensing ability deteriorating. Also, if all the pixels have the monitors respectively, the circuit becomes too large and the size and cost of the sensor tip become excessive. Considering the above problems, it is reasonable that luminosity monitor ability is prepared only in the line sensor parts.

Moreover, in the case that the monitor is prepared in the line sensor parts, by arrangement as shown in the figure, monitor ability will be set in the central position of the area sensor parts, and the photographic subject which should be aimed is monitored. Therefore, suitable accumulating time control can be performed.

As to the image forming lens corresponding to this sensor, the same ones as shown in FIG. 4 can be used. In this case, the positioning relationship between the photographic subject and the monitor is the same as shown in FIG. 13C.

Figure 16:
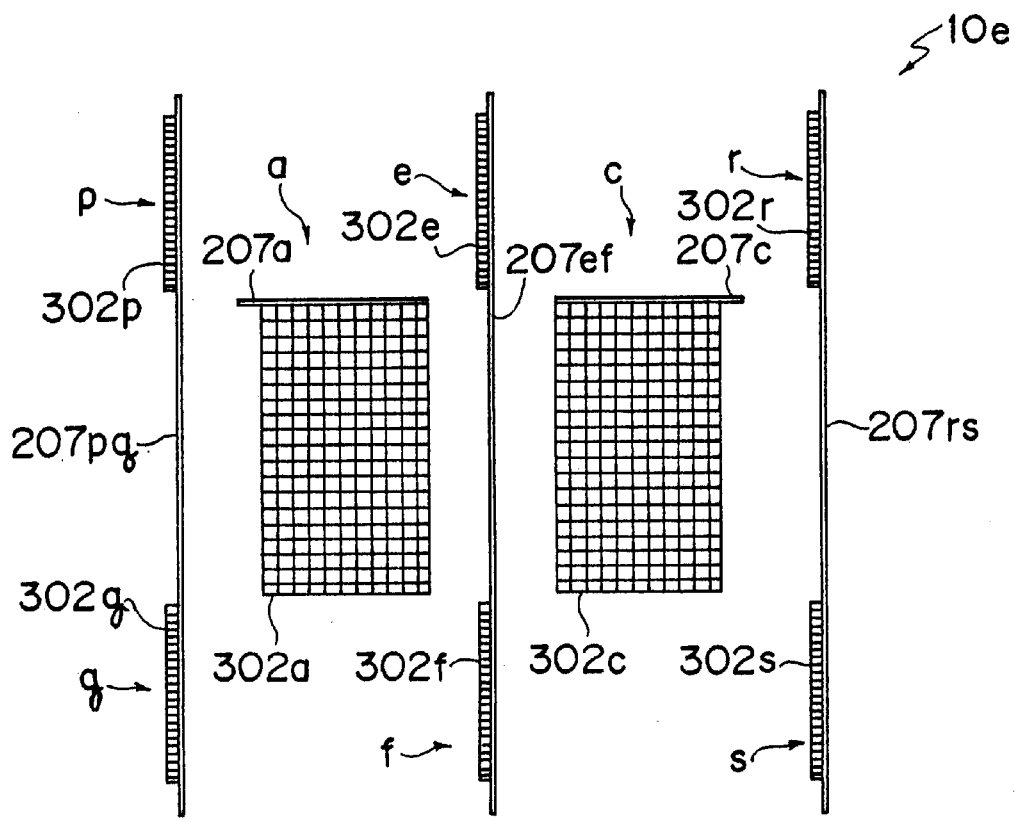
FIG. 16 is a plan view of a sensor in a focus detecting device of a camera according to a sixth embodiment of the present invention.
Figure 17:
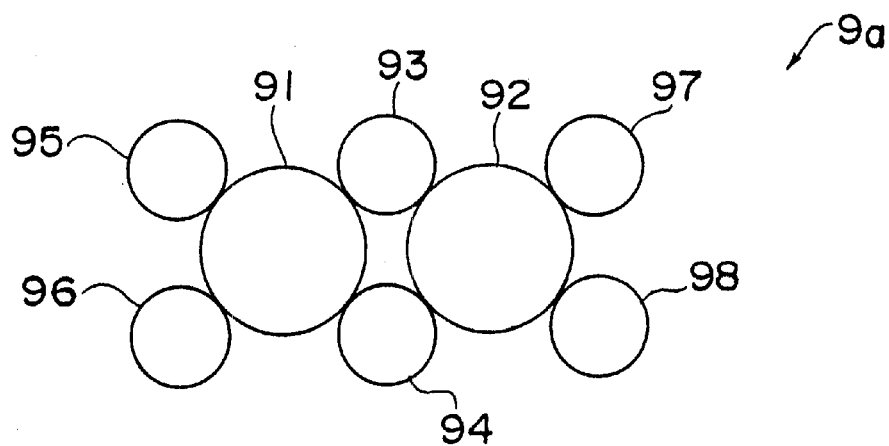
FIG. 17 is a schematic diagram showing a main part of an image taking lens in the camera as shown in FIG. 16.

FIGS. 16 and 17 show a sensor 10e and a separator lens 9a for a focus detecting device of a camera according to the sixth embodiment of the present invention.

In this embodiment, the sensor 10e, which is of the CMOS type as well as the sensor 10d shown in FIG. 15, is provided with three sets of the line sensor parts and a set of the area sensor parts. Every set of the line sensor parts has luminosity monitor ability independently. Luminosity monitor ability for the central set of the line sensor parts performs controlling the area sensor parts simultaneously. Namely, independent sets of the line sensor parts are provided astride the central set of the line sensor parts and the area sensor parts astride it, which are equal to those as shown in FIG. 15. The number of the line sensor parts can also be increased further. Arranging of the line sensor parts cannot be limited in vertical direction and it is also possible to arrange the line sensor parts horizontally along the upper and lower sides of the area sensor parts.

As shown in FIG. 16, the line sensor parts p, q; e, f; r, s are arranged along the both sides of the central area sensor parts a and c. Therefore, the number of the pixels placed in a longitudinal direction is more than that of the pixels placed in a transverse direction. The image separator lens 9*a* corresponding to these sensors part needs three pairs of lenses 93–98 for the line sensor parts arranged in a longitudinal direction and a pair of lens 91 and 92 for the area sensor parts, as shown in FIG. 17. Each of the lenses 93–98 for the line sensor parts has a same diameter and a same focal length, respectively. The diameter of the lenses 91 and 92 for the area sensor parts is larger than that of the lenses 93–98 for the line sensor parts.

The distance measuring method using the area sensors, used in each of above-mentioned embodiments, are well known and described, for example, in U.S. Pat. No. 5,815,742. The monitor controlling method and how to use the area sensors, used therein, are also well known in the art and described, for example, in Japanese Non-examined Patent Publication No. 10-126681. The operating method for focus detection, used therein, is also well known in the art and described, for example, in U.S. Pat. No. 5,923,909.

As the description is made above, the focus detecting devices in each of the above-mentioned embodiments according to the present invention can reduce detection errors, even if luminosity distribution of the photographic subject is not uniform.

In case that the brightness monitoring photo acceptance units are separated from the area photo acceptance units, although the brightness monitoring photo acceptance units make the open area ratio in pixels for ranging (detecting a focus), namely light receiving area rate in image forming area to decreases, the construction can be made simplified without additional circuit as described below.

In the case that a central portion in the at least one of the area photo acceptance units may perform as the brightness monitoring photo acceptance units which detect the subject region, additional circuit for selectively reading the central pixels in the area photo acceptance units as the brightness monitor needs to be provided and then the construction thereof may become larger. However, the open area ratio for ranging (or focus detection) can be set up to be wider and image forming area can be used more efficiently.

In case that the area photo acceptance units for detecting the subject region have two parts and between them the brightness monitor photo acceptance unit is disposed, the two parts can be arranged symmetrically with respect to the brightness monitor photo acceptance unit, and the circuit therefor can be designed similarly. Therefore, that is convenient in designing.

In the case that the area photo acceptance units are controlled with the same accumulating time by using the brightness monitor photo acceptance units, output levels of the area photo acceptance units can be unified and then it is easy to process the output data thereof. Moreover, that makes circuit construction simple and controlling easy.

As the embodiment in which the detecting device provides both line photo acceptance units and area photo acceptance units, if the brightness monitoring portion is arranged between the area photo acceptance units, the area photo acceptance units have dead zone at the position which the brightness monitoring portion is arranged. On the other hand, if the brightness monitoring portion is not arranged between the area photo acceptance units, it is possible that the area photo acceptance units can not have dead zone therebetween.

In the case that first and second pairs of the photo acceptance units are arranged in crossing direction, the photo acceptance units can be arranged in small area efficiently.

The photo acceptance units and brightness monitoring portion may be separated or integrated. It is possible that separated photo acceptance units, as for at least one of which the brightness monitoring portion provides, are arranged nearly in a direction passing through the centers in a pair of a photographic subject images. Also, it is possible that separated photo acceptance units, at least one of which perform as the brightness monitoring portion respectively, are arranged nearly in a direction passing through the centers in a pair of a photographic subject images. In this case, the number of the acceptance units becomes small.

In the case that the second positions are symmetrical about a point centered between the first position and the brightness monitoring portion is arranged at generally central position between the first pair of photo acceptance units, the brightness monitoring portion can monitor near the center of a pair of photographic subject images and it is possible to reduce the detecting errors.

By using two pairs of the images of the same photographic subject, even if a contrast distribution in one direction is uniform, a focus can be detected depending on another contrast distribution in another direction in many cases. Thus, the possibility to detect a focus or a distance from the subject can increase.

Although the present invention has been fully described in connection with the preferred embodiments thereof with reference to the accompanying drawings, it is to be noted that various other changes and modifications are also apparent to those skilled in the art.

For example, the present invention can be applied to not only cameras but also any other apparatus in various fields.

What is claimed is:

1. A detecting device for detecting one of a focusing condition and a distance from a subject comprising:
   optical members which form respective subject images on respectively individual positions;
   area photo acceptance units, which are of a charge accumulation type, arranged on the respectively individual positions focused by the optical members; and
   at least one brightness monitoring photo acceptance unit, arranged to detect brightness of a subject image within a detecting area of at least one of the area photo acceptance units, for controlling charge accumulating time of the area photo acceptance units.

2. The detecting device as claimed in claim 1, in which the brightness monitoring photo acceptance units are separated from the area photo acceptance units.

3. The detecting device as claimed in claim 1, in which a central portion in the at least one of the area photo acceptance units performs as the brightness monitoring photo acceptance units which detect a region of the subject.

4. The detecting device as claimed in claim 1, in which the area photo acceptance units for detecting a region of the subject have two parts, between which the at least one of brightness monitor photo acceptance unit is disposed.

5. The detecting device as claimed in claim 1, in which the area photo acceptance units are controlled with a same charge accumulating time by using the brightness monitor photo acceptance units.

6. The detecting device as claimed in claim 2, in which the area photo acceptance units are controlled with a same charge accumulating time by using the brightness monitor photo acceptance units.

7. The detecting device as claimed in claim 3, in which the area photo acceptance units are controlled with a same charge accumulating time by using the brightness monitor photo acceptance units.

8. A detecting device for detecting one of a focusing condition and a distance from a subject comprising:
- optical members which form respective subject images on respectively individual positions;
- area photo acceptance units, which are of a charge accumulation type, arranged on some of the respectively individual positions focused by the optical members;
- line photo acceptance units, which are of the charge accumulation type, arranged on others of the respectively individual positions focused by the optical members; and
- a brightness monitor photo acceptance unit for controlling the area photo acceptance units and/or the line photo acceptance units, which is arranged at a side of the line photo acceptance units.

9. A detecting device for detecting one of a focus and a distance from a subject comprising:
- optical members which form respective subject images on respectively individual positions;
- area photo acceptance units arranged on some of the respectively individual positions focused by the optical members; and
- charge accumulation type line photo acceptance units arranged on others of the respectively individual positions focused by the optical members, wherein charge accumulating time of the area photo acceptance units and/or charge accumulating time of the charge accumulation type line photo acceptance units are/is controlled by using the charge accumulation type line photo acceptance units.

10. A detecting device for detecting one of a focus and a distance from a subject comprising:
- a first pair of lenses which form a first pair of respective subject images on a first pair of respectively individual positions;
- a second pair of lenses which form a second pair of respective subject images on a second pair of respectively individual positions, a line passing through the first pair of respectively individual positions crossing a line passing through the second pair of respectively individual positions;
- a first set of solid-state image sensing devices which include a first pair of photo acceptance units, having two-dimensional array or matrix, for sensing the first pair of respective subject images focused by the first pair of lenses, respectively; and
- a second set of solid-state image sensing devices which include a second pair of photo acceptance units, having one-dimensional array or line, for sensing the second pair of subject images focused by the second pair of focusing lenses, respectively, and a brightness monitoring portion for monitoring brightness at or near the second photo acceptance units, whereby the first set of solid-state image sensing devices and the second set of solid-state image sensing devices are controlled by using the brightness monitoring portion.

11. The detecting device as claimed in claim 10, in which the second pair of photo acceptance units and the brightness monitoring portion are separate from each other, and are arranged along the line passing through the second pair of respectively individual position.

12. The detecting device as claimed in claim 10, in which some of the second pair of photo acceptance units, arranged nearly along the line passing through the second pair of respectively individual positions, perform as the brightness monitoring portion.

13. The detecting device as claimed in claim 10, in which the second pair of respectively individual positions are symmetrical about a point centered between the first pair of respectively individual positions, and the brightness monitoring portion is arranged to monitor nearly the center of the first pair of photo acceptance units.

14. The detecting device as claimed in claim 10, in which the first pair of lenses and the second pair of lenses form the first pair of respective subject images and the second pair of respective subject images, regarding a same partial region in a subject region, respectively, and the first set of solid-state image sensing devices and the second set of solid-state image sensing devices detect the same partial region in the subject region.

15. A camera having a detecting device for detecting one of a focusing condition of a taking lens and a distance from a subject to be photographed, said camera comprising:
- optical members which form respective subject images on respectively individual positions;
- area photo acceptance units, which are of a charge accumulation type, arranged on the respectively individual positions focused by the optical members; and
- at least one brightness monitoring photo acceptance unit, arranged to detect brightness of a subject image within a detecting area of at least one of the area photo acceptance units, for controlling charge accumulating time of the area photo acceptance units.

16. The camera as claimed in claim 15, in which the brightness monitoring photo acceptance units are separated from the area photo acceptance units.

17. The camera as claimed in claim 15, in which a central portion in the at least one of the area photo acceptance units performs as the brightness monitoring photo acceptance units which detect a region of the subject.

18. The camera as claimed in claim 15, in which the area photo acceptance units for detecting a region of the subject have two parts, between which the at least one of brightness monitor photo acceptance unit is disposed.

19. The camera as claimed in claim 15, in which the area photo acceptance units are con trolled with a same charge accumulating time by using the brightness monitor photo acceptance units.

20. The camera as claimed in claim 16, in which the area photo acceptance units are controlled with a same charge accumulating time by using the brightness monitor photo acceptance units.

21. The camera as claimed in claim 17, in which the area photo acceptance units are controlled with a same charge accumulating time by using the brightness monitor photo acceptance units.

22. A camera having a detecting device for detecting one of a focusing condition of a taking lens and a distance from a subject to be photographed, said camera comprising:
- optical members which form respective subject images on respectively individual positions;
- area photo acceptance units, which are of a charge accumulation type, arranged on some of the respectively individual positions focused by the optical members;
- line photo acceptance units, which are of the charge accumulation type, arranged on others of the respectively individual positions focused by the optical members; and
- a brightness monitor photo acceptance unit for controlling the area photo acceptance units and/or the line photo acceptance units, which is arranged at a side of the line photo acceptance units.

23. A camera having a detecting device for detecting one of a focusing condition of a taking lens and a distance from a subject to be photographed, said camera comprising:

optical members which form respective subject images on respectively individual positions;

area photo acceptance units arranged on some of the respectively individual positions focused by the optical members; and charge accumulation type line photo acceptance units arranged on others of the respectively individual positions focused by the optical members, wherein charge accumulating time of the area photo acceptance units and/or charge accumulating time of the charge accumulation type line photo acceptance units are/is controlled by using the charge accumulation type line photo acceptance units.

24. A camera having a detecting device for detecting one of a focusing condition of a taking lens and a distance from a subject to be photographed, said camera comprising:

a first pair of lenses which form a first pair of respective subject images on a first pair of respectively individual positions;

a second pair of lenses which form a second pair of respective subject images on a second pair of respectively individual positions, a line passing through the first pair of respectively individual positions crossing a line passing through the second pair of respectively individual positions;

a first set of solid-state image sensing devices which include a first pair of photo acceptance units, having two-dimensional array or matrix, for sensing the first pair of respective subject images focused by the first pair of lenses, respectively; and a second set of solid-state image sensing devices which include a second pair of photo acceptance units, having one-dimensional array or line, for sensing the second pair of subject images focused by the second pair of focusing lenses, respectively, and a brightness monitoring portion for monitoring brightness at or near the second photo acceptance units, whereby the first set of solid-state image sensing devices and the second set of solid-state image sensing devices are controlled by using the brightness monitoring portion.

25. The camera as claimed in claim 24, in which the second pair of photo acceptance units and the brightness monitoring portion are separate from each other, and are arranged along the line passing through the second pair of respectively individual position.

26. The camera as claimed in claim 24, in which some of the second pair of photo acceptance units, arranged nearly along the line passing through the second pair of respectively individual positions, perform as the brightness monitoring portion.

27. The camera as claimed in claim 24, in which the second pair of respectively individual positions are symmetrical about a point centered between the first pair of respectively individual positions, and the brightness monitoring portion is arranged to monitor nearly the center of the first pair of photo acceptance units.

28. The camera as claimed in claim 24, in which the first pair of lenses and the second pair of lenses form the first pair of respective subject images and the second pair of respective subject images, regarding a same partial region in a subject region, respectively, and the first set of solid-state image sensing devices and the second set of solid-state image sensing devices detect the same partial region in the subject region.

* * * * *